(12) United States Patent
Damerau

(10) Patent No.: US 11,298,817 B2
(45) Date of Patent: Apr. 12, 2022

(54) PLANETARY GEARING FOR A ROBOT GEARING ARRANGEMENT

(71) Applicant: Schaeffler Technologies AG & Co. KG, Herzogenaurach (DE)

(72) Inventor: Jochen Damerau, Tokyo (JP)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/299,539

(22) PCT Filed: Dec. 5, 2019

(86) PCT No.: PCT/DE2019/101041
§ 371 (c)(1),
(2) Date: Jun. 3, 2021

(87) PCT Pub. No.: WO2020/119856
PCT Pub. Date: Jun. 18, 2020

(65) Prior Publication Data
US 2022/0024030 A1   Jan. 27, 2022

(30) Foreign Application Priority Data
Dec. 10, 2018  (DE) ............... 10 2018 131 625.9

(51) Int. Cl.
*F16H 1/28* (2006.01)
*B25J 9/10* (2006.01)
*F16H 57/08* (2006.01)

(52) U.S. Cl.
CPC ........... *B25J 9/103* (2013.01); *F16H 1/2836* (2013.01); *F16H 1/2863* (2013.01); *F16H 57/08* (2013.01)

(58) Field of Classification Search
CPC ...... B25J 9/103; F16H 1/2836; F16H 1/2863; F16H 57/08
See application file for complete search history.

(56) References Cited

U.S. PATENT DOCUMENTS

| 4,944,195 | A |   | 7/1990 | Takahashi et al. |
| 5,336,137 | A |   | 8/1994 | Kawakita |
| 5,558,593 | A | * | 9/1996 | Roder ............... F16H 1/28 475/331 |

(Continued)

FOREIGN PATENT DOCUMENTS

| DE | 1500451 A1 | 5/1969 |
| DE | 19536177 A1 | 3/1997 |

(Continued)

*Primary Examiner* — Justin Holmes
(74) *Attorney, Agent, or Firm* — Antun Peakovic

(57) ABSTRACT

A planetary gearing for a robot gearing arrangement includes a sun gear, a ring gear, and a planet carrier with at least three planetary gears rotatably mounted thereon. The planetary gears are arranged on planet pins arranged perpendicular to the planet carrier and are in meshing engagement with the sun gear and the ring gear. At least one first planetary gear is biased in a first circumferential direction and/or at least one second planetary gear is biased in a second circumferential direction. A first planet pin of the first planetary gear is at least partially elastically deformable in the second circumferential direction and/or the second planet pin of the second planetary gear is at least partially elastically deformable in the first circumferential direction.

17 Claims, 2 Drawing Sheets

(56) References Cited

U.S. PATENT DOCUMENTS

| | | | | |
|---|---|---|---|---|
| 2005/0075211 A1* | 4/2005 | Fox | ............... | F16C 19/386 |
| | | | | 475/348 |
| 2008/0182708 A1 | 7/2008 | Kato | | |
| 2010/0296934 A1* | 11/2010 | Warren | ............... | F03D 15/00 |
| | | | | 416/170 R |
| 2014/0309071 A1 | 10/2014 | Croce et al. | | |

FOREIGN PATENT DOCUMENTS

| | | | | |
|---|---|---|---|---|
| DE | 202012005741 U1 | 9/2013 | | |
| EP | 2735767 A1 | 5/2014 | | |
| GB | 1101131 A | 1/1968 | | |
| GB | 2413836 A * | 11/2005 | ............ | F16H 1/2836 |
| JP | H078878 B2 | 12/1989 | | |
| JP | 2017008837 A | 1/2017 | | |
| WO | WO-2009152306 A1 * | 12/2009 | ............ | F03D 15/10 |
| WO | 2011047448 A1 | 4/2011 | | |

\* cited by examiner

PLANETARY GEARING FOR A ROBOT GEARING ARRANGEMENT

CROSS-REFERENCE TO RELATED APPLICATIONS

This application is the U.S. National Phase of PCT Appln. No. PCT/DE2019/101041 filed Dec. 5, 2019, which claims priority to DE 10 2018 131 625.9 filed Dec. 10, 2018, the entire disclosures of which are incorporated by reference herein.

TECHNICAL FIELD

The disclosure relates to a planetary gearing for a robot gearing arrangement, comprising a sun gear, a ring gear, and a planet carrier having at least three rotatably mounted planetary gears, which are each arranged on a respective planet pin and are in meshing engagement with the sun gear and the ring gear. The disclosure further relates to a robot gearing arrangement having such a planetary gearing.

BACKGROUND

Robots need precision gearings that are designed to be essentially free of play. In other words, meshing engagement between two gears must be designed in such a way that there is little or no play between the tooth flanks of the gears. Play between the tooth flanks of gears is undesirable in precision gearings for robotics applications because it creates inaccuracies in the sequence of movements. Furthermore, due to play, sudden contact processes at the tooth entry and exit can result in undesirable torque peaks and noises.

EP 27 35 767 A1 discloses a planetary gearing with a sun gear and a ring gear, which mesh with at least one first planetary gear of a planetary stage. The planetary stage has a first planet carrier on which the first planetary gear is rotatably mounted, with at least one second planetary gear also being present in the planetary stage, which also meshes with the ring gear and the sun gear, wherein the second planetary gear is rotatably mounted on a second planet carrier of the planetary stage, wherein the two planet carriers are biased against one another in the circumferential direction of the sun gear so that the first planetary gear is also biased relative to the second planetary gear in the circumferential direction of the sun gear.

SUMMARY

It is desirable to further develop a generic planetary gearing so as to prevent or at least further reduce play. This is achieved by a planetary gearing as described herein.

A planetary gearing for a robot gearing arrangement comprises a sun gear, a ring gear, and a planet carrier with at least three planetary gears rotatably mounted thereon. The planetary gears are arranged on respective planet pins arranged perpendicular to the planet carrier and are in meshing engagement with the sun gear and the ring gear. At least one first planetary gear is biased in a first circumferential direction and/or at least one second planetary carrier is biased in a second circumferential direction. The first planet pin of the first planetary gear is at least partially elastically deformable in the second circumferential direction and/or the second planet pin of the second planetary gear is at least partially elastically deformable in the first circumferential direction. The two circumferential directions are arranged opposite one another. In other words, the planet carrier with the planet pins and planetary gears arranged thereon is biased in at least one, preferably in both circumferential directions, such that prevention or at least reduction of play is achieved between the planetary gears and the ring gear or between the planetary gears and the sun gear in a first and/or second direction of rotation. Consequently, a so-called "backlash" within the planetary gear is thus prevented or reduced. The planetary gears are arranged radially between the sun gear and the ring gear.

The planet pins are preferably at least partially received in a respective recess of the planet carrier. A recess may be understood as an axial through-opening on the planet carrier, wherein each recess at least partially receives one planet pin. The corresponding planetary gear is arranged axially fixed and rotatably mounted on the respective planet pin. The recesses form a bolt circle on the planet carrier, with the relative arrangement of the recesses to one another generating an elastic bias of the respective planetary gear with respect to the ring gear and the sun gear. Consequently, the recesses are not evenly distributed on the circumference, but are arranged on a common circle, spaced apart from one another with varying arc lengths, depending on the bias to be achieved in the first or second circumferential direction.

To bias the first planetary gear in the first circumferential direction, the first recess is positioned tangentially in the direction of the first circumferential direction. Using the example of a single first planetary gear biased in the first circumferential direction, the arc length of the first recess with the first planet pin received therein to the planetary gear adjacent in the first circumferential direction is smaller than the arc length to the planetary gear adjacent in the opposite circumferential direction, whereby the at least one first planetary gear is biased in the first circumferential direction. Here, in the assembled state of the planetary gearing, the first planet pin is at least partially elastically deformed in the second circumferential direction, as a result of which the elastic bias of the second planetary gear is established. The first planet pin deforms at least partially transversely to its longitudinal axis, i.e., the first planet pin is deflected in parallel.

During installation of the at least one first planetary gear in the first recess, the teeth of the at least one first planetary gear come in contact with a first tooth flank on a first tooth flank of the teeth of the sun gear and on a first tooth flank of the teeth of the ring gear. This means that during the operation of the planetary gearing, the teeth of the at least one first planetary gear always mesh with the teeth of the ring gear and the sun gear, wherein the first tooth flanks of the teeth of the at least one first planetary gear glide off the first tooth flanks of the teeth of the ring gear or the sun gear.

In addition or alternatively, the second recess is positioned tangentially in the direction of the second circumferential direction in order to bias the respective second planetary gear in the second circumferential direction. Using the example of a single second planetary gear biased in the second circumferential direction, the distance of the second recess with the second planet pin received therein from the adjacent planetary gear in the second circumferential direction is smaller than the distance from the adjacent planetary gear in the opposite circumferential direction, whereby the at least one second planetary gear is biased in the second circumferential direction. Here, in the assembled state of the planetary gear, the second planet pin is at least partially elastically deformed in the first circumferential direction, as a result of which the bias of the second planetary gear is established. The second planet pin deforms at least partially transversely to its longitudinal axis, i.e., the second planet pin is deflected in parallel.

During mounting of the at least one second planetary gear in the second recess, the teeth of the at least one second planetary gear come in contact with a second tooth flank on a second tooth flank of the teeth of the sun gear and the ring gear. Thus, during operation of the planetary gear, the teeth of the at least one second planetary gear are always in meshing engagement with the teeth of the ring gear and the sun gear, wherein the second tooth flanks of the teeth of the at least one second planetary gear glide off the second tooth flanks of the teeth of the ring gear and the sun gear.

For all operatively connected components, i.e., the at least one first planetary gear, the at least one second planetary gear, the ring gear, and the sun gear, it is true that the first tooth flank of a tooth is arranged opposite the second tooth flank of a tooth of the gear following in the circumferential direction.

It is also conceivable that one or more planetary gears are biased in the first circumferential direction and one or more planetary gears are biased in the second circumferential direction. This ensures that tooth backlash is prevented or at least reduced regardless of the direction of rotation. The planetary gears biased in the first circumferential direction or the planetary gears biased in the second circumferential direction can be arranged on the planet carrier adjacent to one another on the circumference, alternately, in pairs, or in any other desired manner.

The planet pins are preferably fixed in place on the planet carrier. The planet pins are fixed in place during assembly of the planet pins in the planet carrier. To implement the fixation in place, it is conceivable to arrange the respective planet pin fixed in place and rotationally fixed with respect to the planet carrier using further suitable components, for example bearing bushes.

Furthermore, at least a third planetary gear may be provided that is not biased. In other words, the at least one third planetary gear is not biased. The number of biased or non-biased planetary gears depends on the requirements of the planetary gearing. The non-biased planetary gears can each also be mounted on a rigid or non-elastically deformable or only to a small extent elastically deformable planet pin.

Alternatively, all the planetary gears of the planetary gearing may be biased in the first circumferential direction or in the second circumferential direction. For uniform biasing and load application or load transfer, it is advantageous if the number of planetary gears biased in the first circumferential direction corresponds to the number of planetary gears biased in the second circumferential direction. As a result, manufacturing tolerances can be compensated and an efficient and uniform load application within the planetary gear can be achieved.

According to an embodiment, the planetary gears have an at least partially cup-shaped carrier, wherein the elastically deformable planet pins at a first free end are connected to the carrier of the respective planetary gear, and with the planet carrier at a second free end. The planet pins are thus designed as cantilever arms or so-called "flex pins" which are arranged coaxially to the planetary gears. The planet pins are therefore each at least partially passed through the cup-shaped carrier. The carriers also preferably have an end wall that is essentially parallel to the planet carrier, wherein the respective planet pin is connected to the end wall of the carrier.

The carriers are preferably designed to receive a respective gear on their outer circumferential surfaces. In other words, the planetary gears each consist of at least one carrier and one gear. The gear is arranged on the carrier in an axially fixed and rotationally fixed manner. Alternatively, the respective carrier and the associated gear can be integrally formed to form the respective planetary gear.

A robot gearing arrangement has a planetary gearing as described above.

BRIEF DESCRIPTION OF THE DRAWINGS

Further measures to improve the planetary gearing are shown in more detail below together with the description of a preferred exemplary embodiment based on the figures. In the figures.

DETAILED DESCRIPTION

Figure 1:
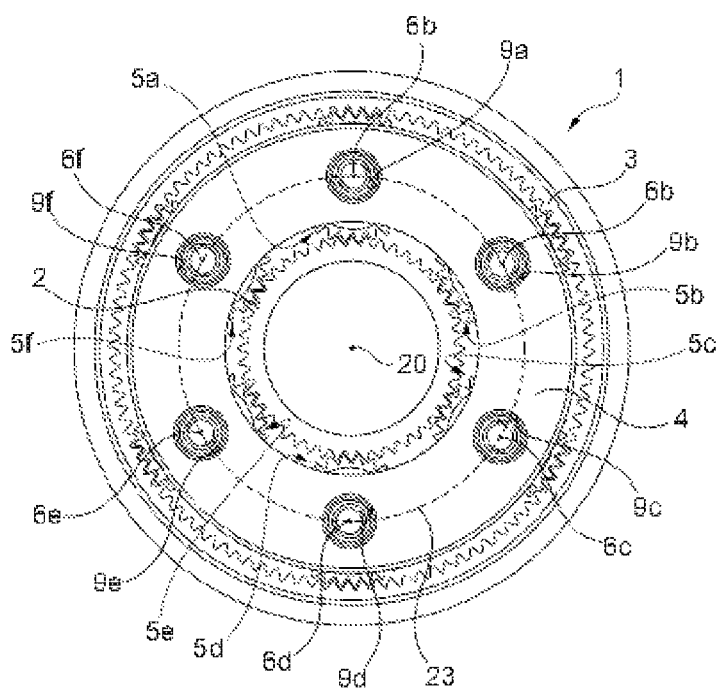
FIG. 1 shows a schematic cross-sectional view to illustrate the structure of a planetary gearing.
Figure 4:
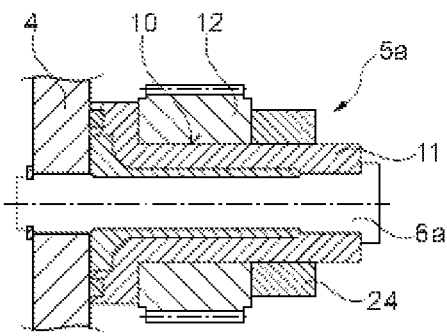
FIG. 4 shows a schematic longitudinal sectional view of the first planetary gear according to FIG. 2 in an unformed state.

According to FIGS. 1 and 4, a planetary gearing 1 for a robot gearing arrangement—not shown here—comprises a sun gear 2, a ring gear 3, and a planet carrier 4 with six planetary gears 5a, 5b, 5c, 5d, 5e, 5f, rotatably mounted thereon, each arranged on an elastically deformable planet pin 6a, 6b, 6c, 6d, 6e, 6f. Thus, each planetary gear 5a, 5b, 5c, 5d, 5e, 5f is rotatably mounted on the associated planet pin 6a, 6b, 6c, 6d, 6e, 6f, wherein the planet pins 6a, 6b, 6c, 6d, 6e, 6f are each fixedly and non-rotatably mounted on the planet carrier 4 in a recess 9a, 9b, 9c, 9d, 9e, 9f The planetary gears 5a, 5b, 5c, 5d, 5e, 5f are spatially arranged between the sun gear 2 and the ring gear 3 and are each in meshing engagement with the sun gear 2 and the ring gear 3. The recesses 9a, 9b, 9c, 9d, 9e, 9f form a bolt circle and are unevenly distributed on a common circle 23 about an axis of rotation 20 of the planet carrier 4. In other words, the recesses 9a, 9b, 9c, 9d, 9e, 9f are arranged at a distance from one another with varying arc lengths, depending on the biasing parameters.

Figure 2:
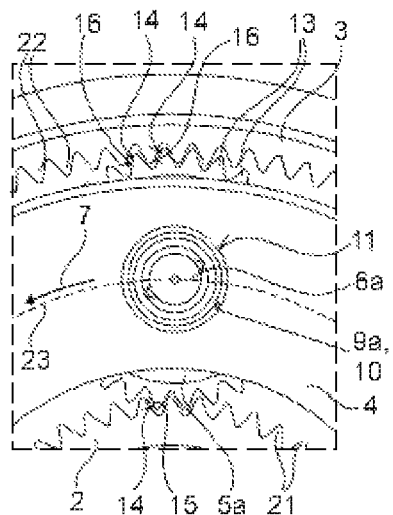
FIG. 2 shows a schematic detailed sectional view of a first planetary gear of the planetary gearing according to FIG. 1.

In the detailed illustration according to FIG. 2, the first planetary gear 5a is biased in a first circumferential direction 7. For this purpose, the relative position of the first recess 9a relative to the adjacent recesses 9b, 9f is arranged in the first circumferential direction 7 such that an arc length between the first and second recesses 9a, 9b is greater than the arc length between the first and sixth recesses 9a, 9f After mounting of the first planetary gear 5a, the teeth 13 of the first planetary gear 5a come in contact with a first tooth flank 14 on a first tooth flank 15 of the teeth 21 of the sun gear 2 and on a first tooth flank 16, 20 of the teeth 22 of the ring gear 3. In this case, the first planet pin 6a is also fastened in a fixed position and rotationally fixed with respect to the planet carrier 4 so that the first planetary gear 5a is biased in the first circumferential direction 7.

Figure 3:
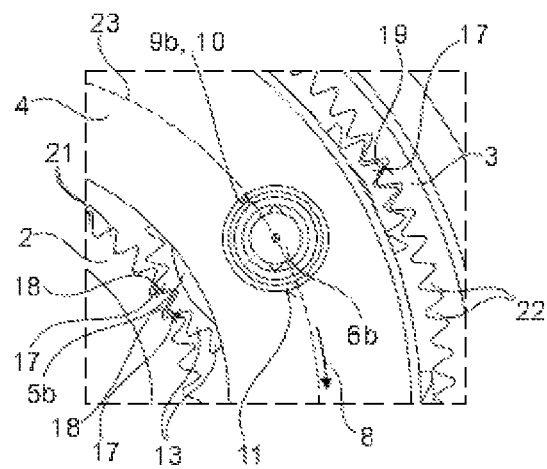
FIG. 3 shows a schematic detailed sectional view of a second planetary gear of the planetary gearing according to FIG. 1.

According to FIG. 3, the second planetary gear 5b is biased in a second circumferential direction 8. For this purpose, the relative position of the second recess 9b relative to the adjacent recesses 9a, 9c is arranged in the second circumferential direction 8 such that an arc length between the first and second recesses 9a, 9b is greater than the arc length between the second and third recesses 9b, 9c. After mounting the second planetary gear 5a, the teeth 13 of the second planetary gear 5b, with a second tooth flank 17, come in contact with a second tooth flank 18 of the teeth 21 of the sun gear 2 and with a second tooth flank 19 of the teeth 22 of the ring gear 3. In this case, the second planet pin 6a is also fastened to be fixed in place and rotationally fixed with respect to the planet carrier 4 so that the second planetary gear 5b is biased in the second circumferential direction 8.

In the present embodiment, analogously to the first planetary gear 5a, the third and fifth planetary gears 5c, 5e are also biased in the first circumferential direction 7. Furthermore, the fourth and sixth planetary gears 5d, 5f, analogously to the second planetary gear 5b, are also biased in the second circumferential direction. All planetary gears 5a, 5b, 5c, 5d, 5e, 5f are therefore biased either in the first circumferential direction 7 or in the second circumferential direction 8. As a result, the load is evenly distributed within the planetary gearing 1. By biasing the first, third, and fifth planetary gears 5a, 5c, 5e in the first circumferential direction 7, and the second, fourth, and sixth planetary gears 5b, 5d, 5f, in the second circumferential direction 8, tooth backlash of the planetary gearing 1 is prevented or at least reduced.

Alternatively, it is conceivable at least the third planetary gear 5c and further alternatively the sixth planetary gear 5f not be biased. In other words, the associated recesses 9c, 9f are arranged in relation to the respective other recesses 9a, 9b, 9d, 9e on the circle 23 such that, in a load-free state, the teeth 13 of these two planetary gears 5c, 5f do not mesh with the ring gear 3 or the sun gear 2. The planetary gears 5c, 5f only come into contact with the ring gear 3 or the sun gear 2 when a load is applied.

Figure 5:
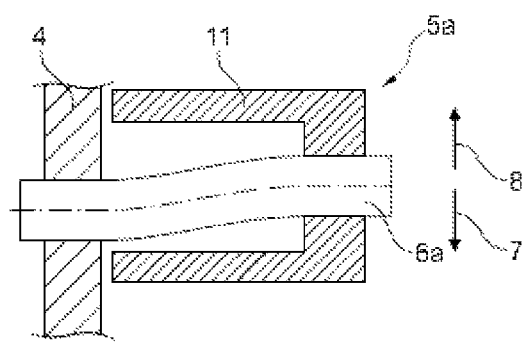
FIG. 5 shows a highly simplified, schematic longitudinal sectional view of the first planetary gear according to FIG. 2.
Figure 6:
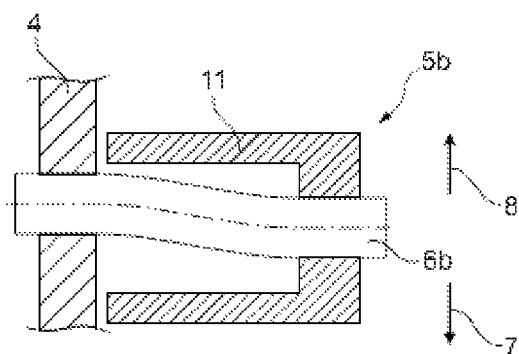
FIG. 6 shows a highly simplified, schematic longitudinal sectional view of the second planetary gear according to FIG. 3.

According to FIGS. 4 to 6, the first planetary gear 5a is shown as an example, which, according to FIG. 4, is formed from two parts, a carrier 11 and a gear 12. The carrier 11 is cup-shaped and faces the planet carrier 4 with its open side. Furthermore, the gear 12 arranged on an outer circumferential surface 10 of the carrier 11 is arranged in an axially and rotationally fixed direction with respect to the carrier 11 by means of a securing element 24. The first planet pin 6a, at a first free end, is connected to the carrier 11 of the first planetary gear 5a and, at a second free end, is connected to the planet carrier 4. All other planetary gears 5b, 5c, 5d, 5e, 5f and planet pins 6b, 6c, 6d, 6e, 6f are designed analogously.

According to FIG. 4, the first planet pin 6a is shown in an unloaded or non-biased state, wherein the first planet pin 6a is designed as a cantilever arm coaxial with the first planetary gear and enables a parallel deflection of the first planet pin 6a so that an elastic bias of the first planetary gear 5a relative to the ring gear 3 and sun gear 2 can be achieved in the manner described.

FIG. 5 shows the first planetary gear 5a according to FIG. 2 after assembly, according to which the first planetary gear 5a is elastically biased in the first circumferential direction 7 and the first planet pin 6a is elastically deformed in the second circumferential direction 8.

In contrast, FIG. 6 shows the second planetary gear 5b according to FIG. 3, according to which the second planetary gear 5b is elastically biased in the second circumferential direction 8 and the second planet pin 6a is elastically deformed in the second circumferential direction 7.

LIST OF REFERENCE SYMBOLS

1 Planetary gearing
2 Sun gear
3 Ring gear
4 Planet carrier
5a, 5b, 5c, 5d, 5e, 5f Planetary gear
6 Planet pin
6a, 6b, 6c, 6d, 6e, 6f Planet pins
7 First circumferential direction
8 Second circumferential direction
9a, 9b, 9c, 9d, 9e, 9f Recess
10 Outer circumferential surface
11 Carrier
12 Gear
13 Tooth of the planetary gear
14 First tooth flank of the planetary gear
15 First tooth flank of the sun gear
16 First tooth flank of the ring gear
17 Second tooth flank of the planetary gear
18 Second tooth flank of the sun gear
19 Second tooth flank of the ring gear
20 Rotational axis
21 Tooth of the sun gear
22 Tooth of the ring gear
23 Circle
24 Securing element

The invention claimed is:

1. A planetary gearing for a robot gearing arrangement, comprising a sun gear, a ring gear, and a planet carrier with at least three planetary gears rotatably mounted thereon, each planetary gear arranged on respective planet pins arranged perpendicularly to the planet carrier, each planetary gear in meshing engagement with the sun gear and the ring gear, wherein at least one first planetary gear of the at least three planetary gears is biased in a first circumferential direction wherein a planet pin of the first planetary gear is at least partially elastically deformable in a second circumferential direction, and wherein the first and second circumferential directions are arranged opposite one another.

2. The planetary gearing according to claim 1, wherein the planet pins are at least partially received in a respective recess of the planet carrier.

3. The planetary gearing according to claim 1, wherein the planet pins are fixed in place on the planet carrier.

4. The planetary gearing according to claim 1, wherein each of the planetary gears have an at least partially cup-shaped carrier, wherein the elastically deformable planet pins at a first free end are connected with the carrier of the respective planetary gear, and with the planet carrier at a second free end.

5. The planetary gearing according to claim 4, wherein the carrier of each planetary gear is configured to receive a gear on its outer circumferential surfaces.

6. The planetary gearing of claim 1 wherein at least one second planetary gear of the at least three planetary gears is biased in the second circumferential direction and a planet pin of the second planetary gear is at least partially elastically deformable in the first circumferential direction.

7. The planetary gearing according to claim 6, wherein at least one third planetary gear is provided which is not biased.

8. The planetary gearing according to claim 6, wherein each of the planetary gears is biased in either the first circumferential direction or in the second circumferential direction.

9. A robot gearing arrangement, comprising a planetary gearing according to claim 1.

10. A planetary gearing, comprising:
a sun gear;
a ring gear;
a planet carrier; and
first, second, and third planet gears rotatably mounted on planet pins fixed to the planet carrier, each of the first, second, and third planet gears meshing with the sun gear and the ring gear; wherein
the planet pins are unequally spaced circumferentially and the planet pin supporting the first planet gear is deformable such that the first planet gear is biased in a first circumferential direction to reduce lash between the planet gears and the sun and ring gears.

11. The planetary gearing of claim 10 wherein the planet pin supporting the second planet gear is deformable and is circumferentially spaced such that the second planet gear is biased in a second circumferential direction opposite the first circumferential direction.

12. The planetary gearing of claim 11 wherein the third planet gear is not biased.

13. The planetary gearing of claim 12 further comprising:
a fourth planet gear radially opposite the first planetary gear and biased in the first circumferential direction;
a fifth planet gear radially opposite the second planetary gear and biased in the second circumferential direction; and
a sixth planet gear radially opposite the third planetary gear and not biased.

14. The planetary gearing of claim 11 further comprising fourth, fifth, and sixth planet gears wherein the third and fifth planet gears are biased in the first direction and the fourth and sixth planet gears are biased on the second direction.

15. The planetary gearing according to claim 10, wherein the first planet gear has a cup-shaped carrier connected with the elastically deformable planet pins at a first end, and wherein the elastically deformable planet pin is connected to the planet carrier at a second end.

16. The planetary gearing according to claim 15, wherein the cup-shaped carrier receives a gear on its outer circumferential surface.

17. The planetary gearing according to claim 15, wherein the cup-shaped carrier is integrally formed with the first planet gear.

* * * * *